US006711578B1

(12) United States Patent
McCaw et al.

(10) Patent No.: US 6,711,578 B1
(45) Date of Patent: Mar. 23, 2004

(54) RULE-BASED, N-WAY, SYNCHRONIZATION OF MULTIPLE COPIES OF A DATABASE

(75) Inventors: Kelly McCaw, San Jose, CA (US); Ravi Duggaraju, Cupertino, CA (US); Cole Goeppinger, San Francisco, CA (US); Brad Jarvinen, San Jose, CA (US)

(73) Assignee: PalmSource, Inc., Sunnyvale, CA (US)

( * ) Notice: Subject to any disclaimer, the term of this patent is extended or adjusted under 35 U.S.C. 154(b) by 331 days.

(21) Appl. No.: 09/764,524

(22) Filed: Jan. 17, 2001

(51) Int. Cl.[7] .............................................. G06F 17/30
(52) U.S. Cl. ...................................................... 707/101
(58) Field of Search ................................ 707/200–203, 707/10, 101

(56) References Cited

U.S. PATENT DOCUMENTS

| | | | | |
|---|---|---|---|---|
| 5,680,609 A | * | 10/1997 | Reinhardt | ..................... 707/10 |
| 5,884,325 A | * | 3/1999 | Bauer et al. ................. 707/201 |
| 6,141,663 A | * | 10/2000 | Hunkins et al. ............ 707/201 |
| 6,401,104 B1 | * | 6/2002 | LaRue et al. ................ 707/203 |

* cited by examiner

Primary Examiner—Safet Metjahic
Assistant Examiner—Marcin Filipczyk
(74) Attorney, Agent, or Firm—Wagner, Murabito & Hao LLP

(57) ABSTRACT

The present invention relates to a method for synchronizing databases in a network environment. Specifically, the present invention pertains to a method of using a set of hierarchical rules to enable an efficient and speedy synchronization between multiple copies of a database. The present invention enables an "n-way" synchronization of databases where "n", the number of databases synchronized, is essentially any number more than two. In one embodiment, the present invention provides rule-based, n-way, synchronization by selecting a focus copy of the database, comparing the data records of the focus copy against the same records in other copies of the database to identify those deleted and modified; removing all the records indicated to be deleted, modifying those to be modified, and adding new record identifiers in the case of multiple modifications to the same record.

19 Claims, 10 Drawing Sheets

RULES TABLE

| | ACTION RECOGNIZED AT SYNCHRONIZATION | DB$_1$ "HERE" | DB$_2$ | DB--- "OUT THERE" | DB$_n$ | RULE |
|---|---|---|---|---|---|---|
| 810a | DELETION OF RECORD R$_1$ IN LOCAL DATA BASE | D$_1$ | - | - | - | DELETE RECORD R$_1$ FROM ALL DATA BASES |
| 810b | DELETION OF RECORD R$_1$ IN ANOTHER DATA BASE | - | D$_1$ | - | - | DELETE RECORD R$_1$ FROM ALL DATA BASES |
| 810c | DELETION OF AND MODIFICATION TO SAME RECORD IN TWO DIFFERENT DATA BASES | D$_1$ | M$_1$ | - | - | WRITE MODIFIED RECORD R$_1$ TO ALL DATA BASES |
| 810d | DELETION OF SAME RECORD IN MULTIPLE DATA BASES | D$_1$ | D$_1$ | - | - | DELETE RECORD R$_1$ FROM ALL DATA BASES |
| 810e | MODIFICATION OF RECORD R$_1$ IN ONE DATA BASE | M$_1$ | - | - | - | WRITE MODIFIED RECORD R$_1$ TO ALL DATA BASES |
| 810f | TWO DIFFERENT MODIFICATIONS TO TWO DIFFERENT RECORDS | M$_1$ | M$_2$ | - | - | WRITE BOTH MODIFIED RECORDS, R$_1$ & R$_2$, TO ALL DATA BASES |
| 810g | ADD A RECORD IN ONE DATA BASE (TREAT LIKE A MODIFICATION) | A$_1$ | - | - | - | ADD RECORD TO ALL DATA BASES WITH SAME RECORD ID THROUGHOUT |
| 810h | DELETION AND MULTIPLE MODIFICATIONS TO SAME RECORD | D$_1$ | M$_1$ | - | M$_n$ | WRITE EACH MODIFIED RECORD TO ALL DATA BASES, WITH NEW RECORD IDs AS NECESSARY |
| 810i | DIFFERENT MODIFICATIONS TO SAME RECORD IN MULTIPLE DATA BASES | M$_1$ | M$_2$ | - | M$_n$ | WRITE EACH MODIFIED RECORDS TO ALL DATA BASES, ADD NEW RECORD IDs AS NECESSARY |
| 810j | SAME MODIFICATION TO SAME RECORD N MULTIPLE DATA BASES | M$_1$ | M$_1$ | - | - | WRITE MODIFIED RECORD TO UNMODIFIED DATA BASES |

$D_1, D_2, D_n$    DELETIONS OF RECORDS $R_1, R_2, R_n$, RESPECTIVELY.
$M_1, M_2, M_n$    MODIFICATIONS TO RECORDS $R_1, R_2, R_n$, RESPECTIVELY.
$A_1$    ADD NEW RECORD
-    NO CHANGE TO RECORD

FIGURE 8

RULE-BASED, N-WAY, SYNCHRONIZATION OF MULTIPLE COPIES OF A DATABASE

FIELD OF THE INVENTION

The present invention relates to a method for synchronizing multiple copies of one or more databases in a network environment including electronic devices.

BACKGROUND OF THE INVENTION

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

Further development of PDAs has enabled their use for portable, and even wireless, access to computer networks. The portability and convenience, and, most importantly, the ready ability to synchronize a palmtop device with other computers and data sources, makes such devices ideal for use in networks that serve the workplace as well as the home.

Synchronization is a process that provides the ability to coordinate the databases maintained on a PDA with copies, or versions, of the same and similar databases maintained on a desktop or other computer, or other electronic device, such as a cell phone. Not only is the access to data generally more readily available on a desktop, but desktops or other networked devices have ready access to printers and communication with other devices in the network and the internet on a continuing basis.

Typically, in a network having a portable electronic device, a 2-way synchronization is accomplished with the portable electronic device in a cradle that communicates with the desktop. Synchronization is initiated at the PDA and the user can generally select whether the PDA's database is to be written over (one-way), or the desktop's database is to be written over (one-way the other way), or all modifications on each are to be incorporated in the other (two-way). Typically, the latter synchronization, two-way, is the most useful.

Historically, however, as the number of databases grows, the number of required synchronizations grows exponentially. Each additional copy of each database needs to be synchronized with all the other copies, resulting in a growth of time required on the order of $2^n$, where n is the number of database copies to be synchronized. This number is repeated for each database maintained.

In a complex network, with a dynamic set of databases, the time devoted to necessary synchronizations grows and could begin to drag down system performance with even a modest number of databases and copies. More importantly, if synchronization takes too long, users will begin to initiate synchronization less frequently than necessary, or worse, avoid it entirely.

What is required, therefore, is a mechanism for rapidly and reliably synchronizing multiple copies of one or more databases in a network environment. The need further exists to allow the expansion of the number of copies of a database that are synchronized without unnecessary limit and without an exponential increase in the amount of time required to accomplish the synchronization process.

SUMMARY OF THE INVENTION

The present invention relates to a method for the rapid and reliable synchronization of multiple copies of one or more databases in a network environment. In one embodiment, the method allows the synchronization of an increasing number of copies of multiple databases without an attendant exponential increase in the amount of time required to accomplish the synchronization.

The present invention relates to a method for synchronizing databases in a network environment. Specifically, the present invention pertains to a method of using a set of hierarchical rules to enable an efficient and speedy synchronization between multiple copies of a database. The present invention enables an "n-way" synchronization of databases where "n", the number of databases synchronized, is essentially any number more than two. The present invention provides rule-based, n-way, synchronization by identifying a focus copy of the database, comparing the data records of the focus copy against the same records in other copies of the database to identify those records that are deleted or modified with respect to the focus copy. A record that is deleted in one database copy but remains unmodified in any other copy is deleted in all database copies. If a record has been both deleted in one copy and modified in another, the invention transmits the modified record across all databases copies and a deleted record is treated like a modified record. The database is cycled through so that all database copies are eventually processed like the focus. On subsequent cycles, records that have already been processed by a focus database are skipped. By performing this process, the method enabled by the present invention allows the speedy maintenance of multiple, synchronized, databases without the inadvertent loss of any data record.

An embodiment of the present invention operates in a system having multiple copies of a database, and includes a method of synchronizing the multiple copies of the database comprising the steps of: a) identifying a focus copy of the multiple copies of the database; b) comparing records of the focus copy against records having a same identification tag but contained in other copies of the database to identify deleted and modified records with respect to the focus copy; c) removing from all the copies of the database a record indicated by step b) as being deleted by any copy of the database, provided the record was not also modified by any other copy of the database; d) with respect to any modified record indicated by step b), writing the modified record to all the copies of the database that do not already contain the modified record; and e) selecting a new focus copy of the copies of the database and repeating steps b)–e) until all the copies of the database have been processed as a focus copy.

Embodiments include the above and those wherein step b) only processes previously unprocessed records of the focus copy. Embodiments further include the above and those wherein step b) also identifies new records of the focus copy and wherein further step d) applies to the new records. Embodiments also include the above and those wherein step d) applies to a record that has been modified in one copy but deleted in another copy of the database.

Embodiments include the above and those wherein step d) applies to a record that has been modified in one copy but deleted in two other copies of the database. Embodiments include the above and those wherein, with respect to a record that has been modified in more than one copy, step d) writes the modifications of the record to all copies of the database that do not already contain the modifications.

BRIEF DESCRIPTION OF THE DRAWINGS

The operation of this invention can be best visualized by reference to the drawings.

FIG. 8 is a Table of Rules implemented as part of one embodiment of the, present invention.

DETAILED DESCRIPTION

Figure 1:
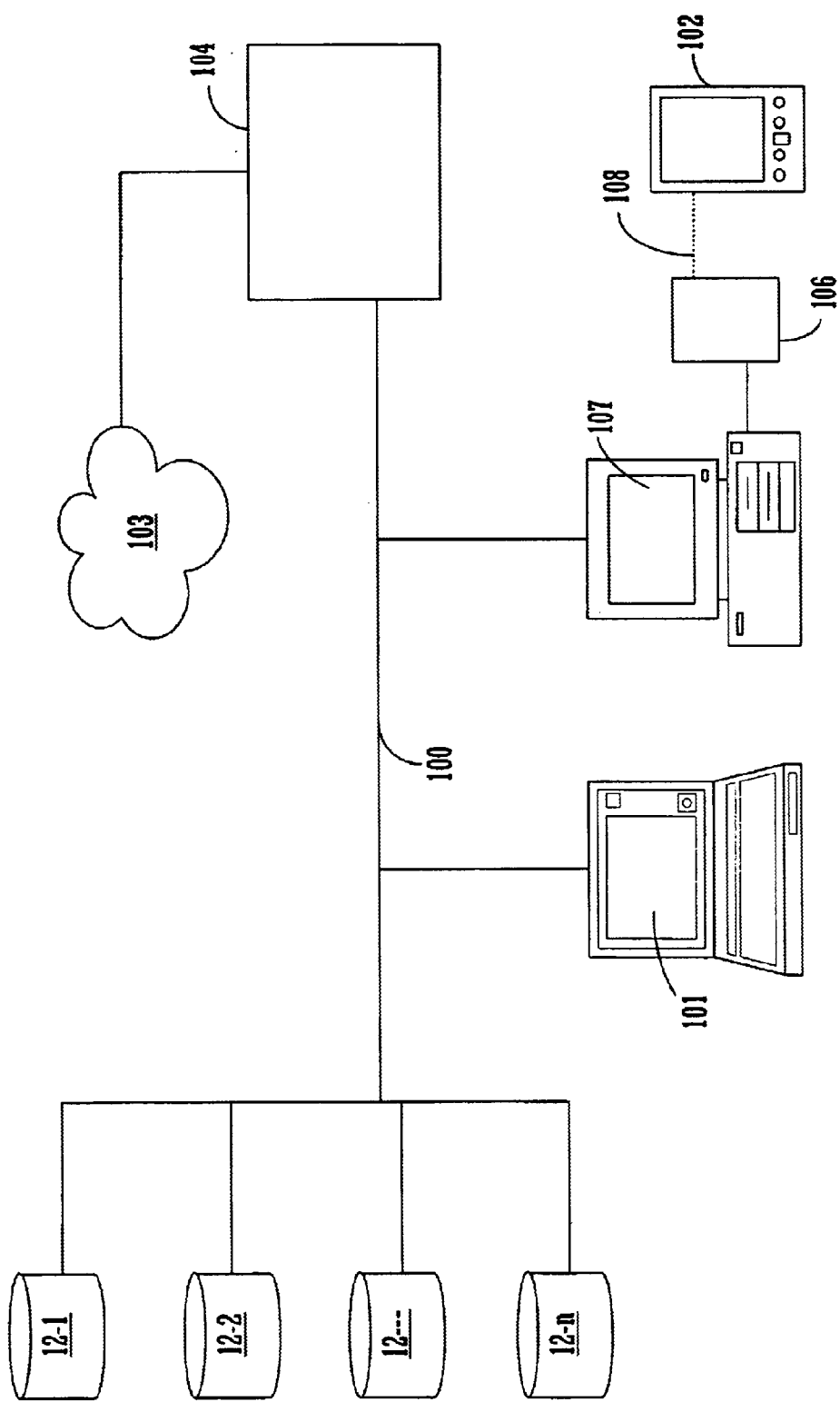
FIG. 1 illustrates a typical network synchronization environment, with multiple databases, in accordance with one embodiment of the present invention.

Reference will now be made in detail to embodiments of the present invention, examples of which are illustrated in the accompanying drawings. While the invention will be described in conjunction with these specific embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or similar terms, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The embodiment of the present invention discussed herein relates to a method of accomplishing, and a system for enabling, the synchronization of multiple versions of one or more databases resident on different devices in a network environment. This embodiment refers to a hardwired cradle connected or wirelessly connected palmtop device or PDA synchronizing to any number of databases coupled to the same network. The network can be a local area network (LAN) or a wide area network (WAN) or merely a cradle connected to a stand-alone desktop. Other embodiments of the present invention, though, may be implemented as synchronizations between laptops, between desktops, or any combination of each.

In this discussion of some embodiments of the present invention, the terms "palmtop", "palm device", "PDA", "handheld device", and "handheld computer" are used more or less interchangeably. In each case, they refer to a class of small, user-portable, computing devices that are capable of coupling with a host device, such as a desktop or laptop computer, and with which the devices can participate in a synchronization between databases. The term "synchronization" refers to the act of making all synchronized versions of a database agree in content.

The operation of this embodiment of the present invention and the environment in which its operates may be best understood by reference to the figures. FIG. 1 presents, in logical form, a typical network in accordance with one embodiment of the present invention. Both desktop computer 107 and laptop 101 are connected to network 100 which is also served by server 104. Server 104 also, in this implementation, provides connectivity to internet 103. Connected to desktop 107 is palmtop device cradle 106 which provides a means of connecting, 108, palmtop device 102. By supplying this connection, desktop 107 takes on the role of host device to palmtop device 102. Also connected to network 100 are database copies 12-1 through 12-n. The numbering of these other databases is meant to signify that there is no actual limit to the number of databases served and synchronized in this embodiment of the present invention. Although the connectivity of palmtop device 102 is shown in this embodiment to be by hardwired cradle (see FIG. 4), other embodiments may employ infrared, RF or any other means of connectivity between the host device and the portable device. By whatever means connected, the object of synchronization is to conform all copies of any given database, for example database copies 12-1 through 12-$n$ of FIG. 1, to the same content.

Figure 2:
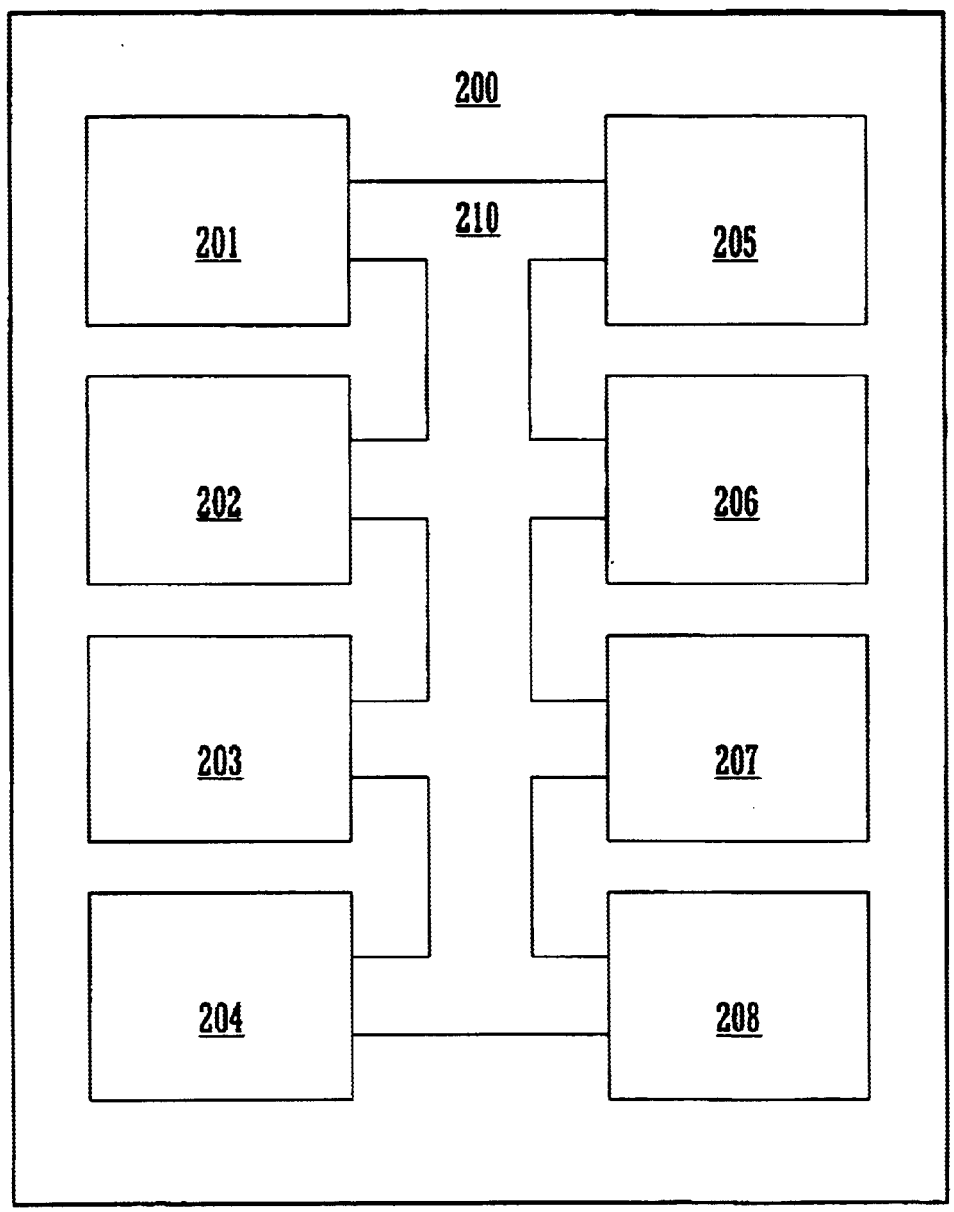
FIG. 2 is a block diagram illustrating an embodiment of a portable computer system in accordance with one aspect of the present invention.
Figure 3:
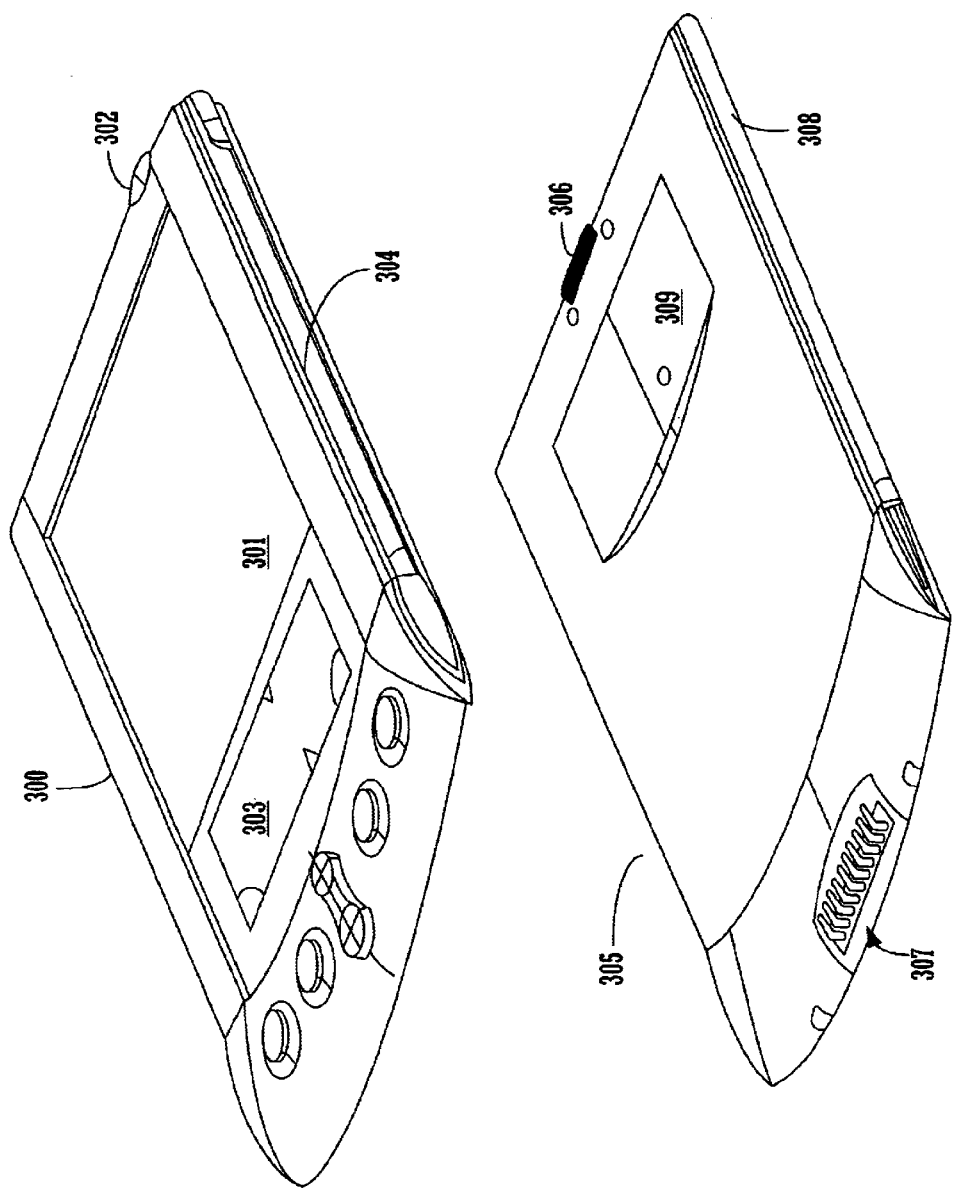
FIG. 3 illustrates a physical embodiment of a portable computer system in accordance with one embodiment of the present invention.
Figure 5:
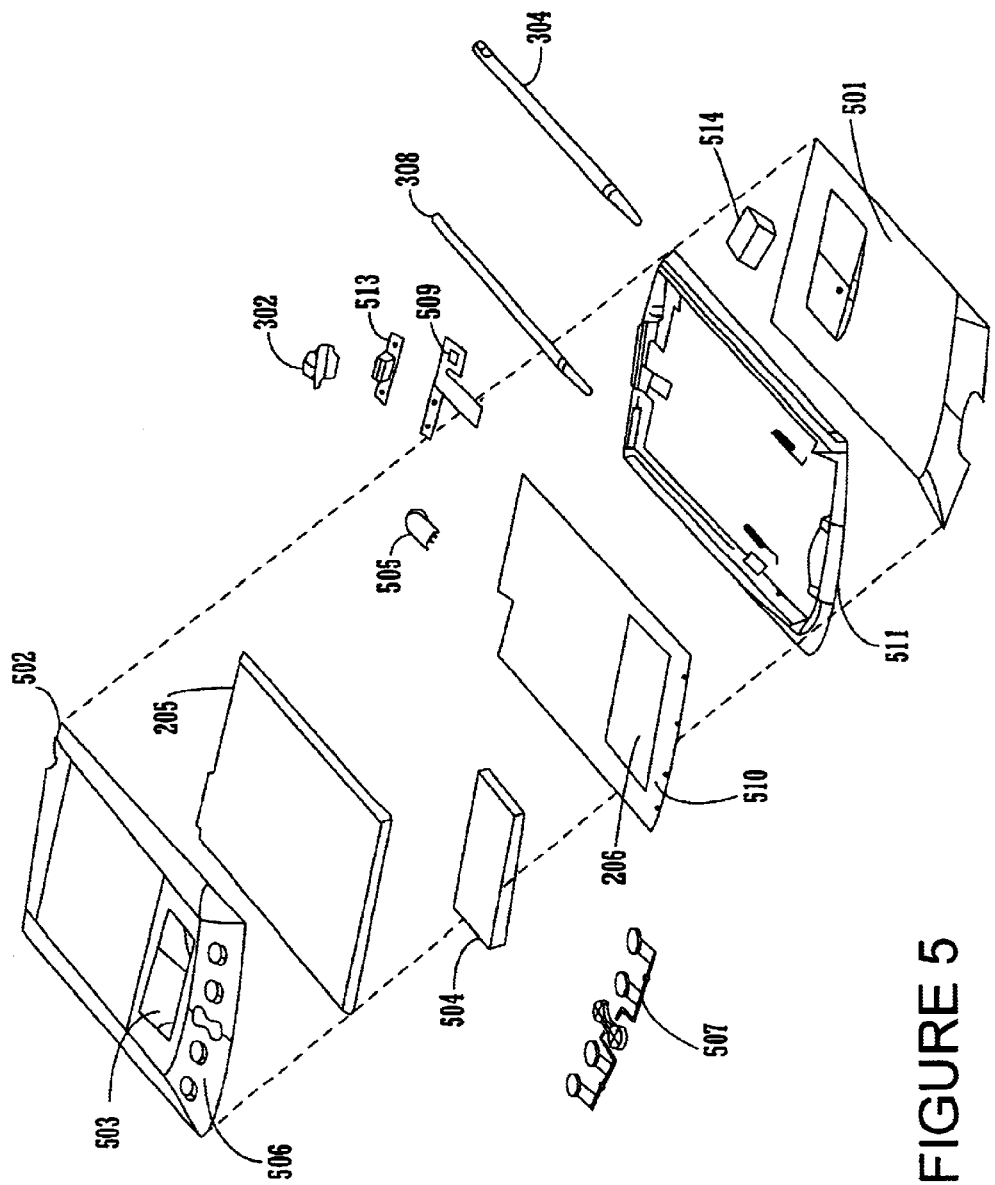
FIG. 5 illustrates an exploded view of a typical portable computing device in accordance with one embodiment of the present invention.

A typical palmtop device is illustrated in FIGS. 2, 3 and 5. FIG. 2 illustrates, in block diagram, a configuration typical to a palmtop device or PDA consistent with this embodiment of the present invention. Computer system 200 comprises bus 210 which connects processor 201, volatile RAM 202, non-volatile ROM 203 and data storage device 204. Also connected to the bus are display device 205, alpha-numeric input device 206, cursor control 207, and signal I/O device 208. Signal I/O device 208 is implemented as a serial connection, an infrared transceiver or an RF transceiver and any one of them can, in some embodiments, be used as the link for synchronization.

FIG. 3, a top and bottom view of a typical palmtop device, illustrates the physical implementation of some of the logical devices above. Panel 301, in top view 300, integrates the display device and, when touched with stylus 304, cursor control. Alpha-numeric input is via input panel 303. Power to the device is applied when on/off button 302 is depressed. Connection to a network can be implemented either through an RF connection using extendible antenna 308, or by infrared (IR) connection. IR connection is provided by IR window 306 which is shown on bottom view 305. Connector array 307 provides the capability for wired connectivity to a desktop computer and thence a network by the use of a cradle (See FIG. 4). Although implemented in this embodiment as a serial port, wired connectivity via connector 307 could also alternatively be any of a number of well known communication standards and protocols, e.g., parallel, SCSI (small computer system interface), Firewire (IEEE 1394), Ethernet, etc.

Further illustration of these devices is given in FIG. 5. FIG. 5 is an exploded view of palmtop computer system 200 in accordance with one implementation. Computer system 200 contains a back cover 501 and a front cover 502 having an outline of region 503 and holes 506 for receiving buttons 507. A flat panel display 205 (both liquid crystal display and touch screen) fits into front cover 502. Any of a number of display technologies can be used, e.g., liquid crystal display (LCD), field emission display (FED), plasma, etc., for the flat panel display 205. A battery 504 provides electrical power. A contrast .,adjustment 505, a potentiometer in this embodiment, is also shown, as well as an on/off button 302. A flex circuit 509 is shown along with a printed circuit (PC) board 510 containing electronics and logic (e.g., memory, communication bus, processor, etc.) for implementing computer system functionality. The digitizer pad 206, implementing one means of alpha-numeric input, is also included in PC board 510. A midframe 511 is shown along with stylus 304. Position-adjustable antenna 308 is also shown.

Infrared communication mechanism 513 (e.g., an infrared emitter and detector device) is for sending and receiving information from other similarly equipped devices or, in this embodiment, communicating with a host device in a network (see FIG. 1). An embodiment implementing communication with a network through the infrared device does not preclude additional implementation of communication through other means such as an RF link.

To illustrate the implementation of an RF link in an embodiment of the present invention, a signal (e.g., radio) receiver/transmitter device 514 is also shown in FIG. 5. The receiver/transmitter device 514 is coupled to the antenna 308 and also coupled to communicate with the PC board 510. In one implementation the Mobitex wireless communication system is used to provide two-way communication between computer system 100 and other networked computers and/or the Internet via a proxy server (104 in FIG. 1).

FIG. 5 illustrates the implementation of several features illustrated in FIG. 2. Some circuitry of computer system 200 can be implemented directly on PC board 510 (FIG. 5). PC board 510 can contain processor,201, bus 210, ROM 203 and RAM 202.

With reference still to FIGS. 2 and 5, computer system 200 also includes a signal transmitter/receiver device 514, which is coupled to bus 210 for, providing a physical communication link between computer system 200, and a network environment (e.g., network environment 100 of FIG. 1). As such, signal transmitter/receiver device 514 enables central processor unit 201 to communicate wirelessly with other electronic systems coupled to the network. It should be appreciated that within the present embodiment, signal transmitter/receiver device 514 is coupled to antenna 308 (FIGS. 3 and 5) and provides the functionality to transmit and receive information over a wireless communication interface. It should be further appreciated that the present embodiment of signal transmitter/receiver device 514 is well suited to be implemented in a wide variety of ways. For example, signal transmitter/receiver device 514 could also be implemented as a modem.

Figure 4:
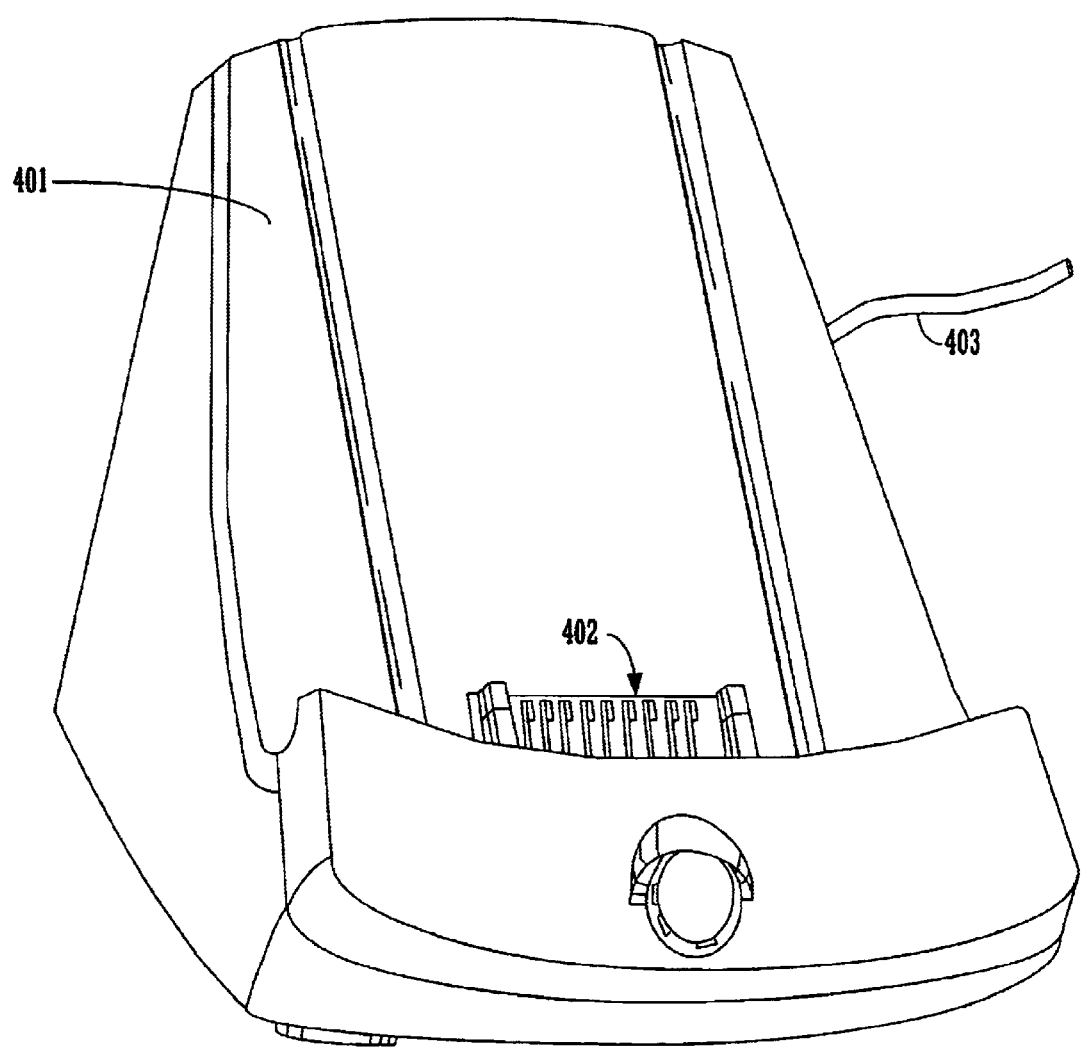
FIG. 4 illustrates a cradle for an alternative connection of a typical portable computing device in accordance with one embodiment of the present invention.

The typical connection between a portable computing device and it associated host device is by a cradle connected to a serial port on the host device. FIG. 4 is an illustration of a typical cradle. To connect, the palmtop device is set in cradle 401 where connector array 402 contacts the counterpart connectors on the portable device. The connectors, through cable 403, enable serial communication with the host device. The host device is represented in this embodiment as desktop 107 in FIG. 1.

Referring again to FIG. 1, synchronization is initiated either by palmtop 102 or desktop 107. Desktop 107 is connected to network 100 which is served by server 104 and to which laptop 101 is also connected. Again, server 104 provides link to internet 103.

Figure 6:
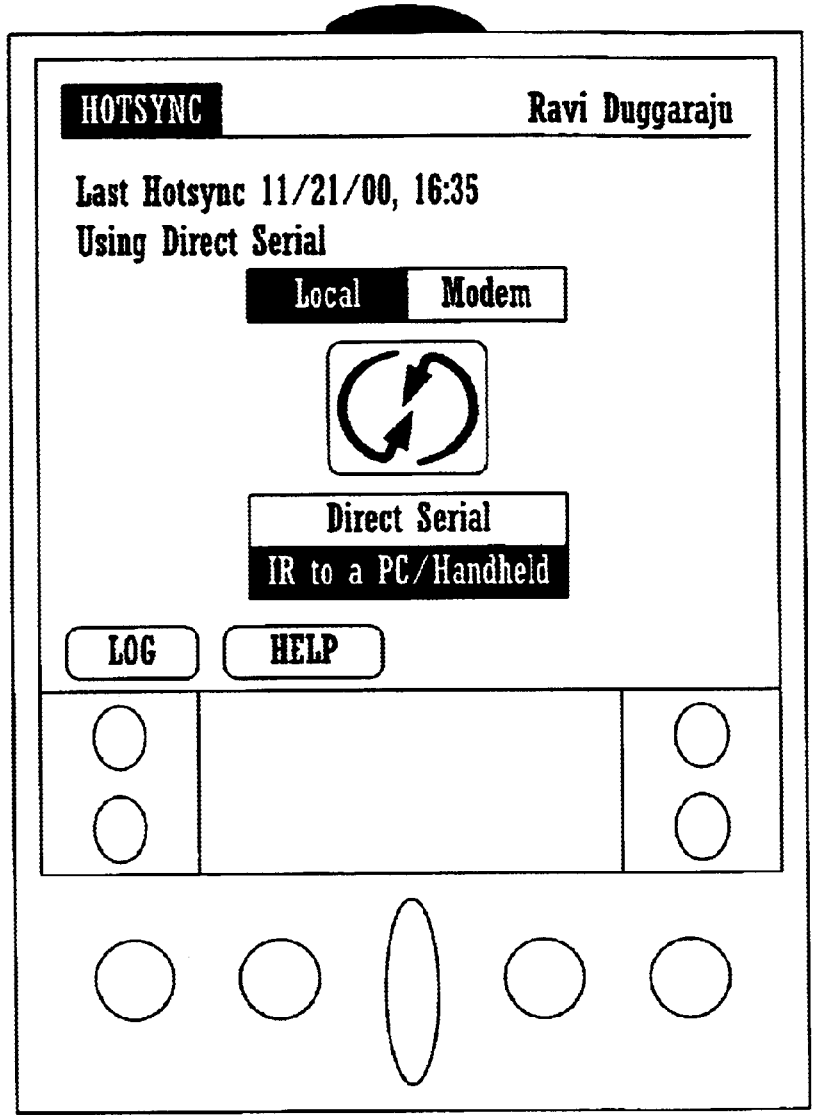
FIG. 6 illustrates one possible implementation of a display in accordance with one embodiment of the present invention.

With or without the connection to the network, a synchronization initiated by either portable device 102 or host device 107 is normally limited to the database copies on each. Since there are two versions of each synchronized database, one each resident on host device 107 and portable device 102, this is known as a "2-way" synchronization. FIG. 6 illustrates a display presented during synchronization on a typical palmtop device.

When the number of versions, or copies, of any database being synchronized is more than two, the technical aspects of synchronization increase significantly. The letter "n" is used mathematically to indicate an integer of undetermined size. In synchronization parlance, it is used to indicate any integer larger than two and it refers to the number of versions of a database being synchronized. Thus a more-than-two-way synchronization is known as an "n-way" synchronization. Referring again to FIG. 1, if synchronization is initiated that also synchronizes versions of databases resident on laptop 101 and/or server 104, then FIG. 1 would further illustrate a logical arrangement suitable to a three-way, or four-way, synchronization on network 100.

Two-way synchronizations are, in most embodiments, relatively simple processes, wherein data records within a database are compared and modified as necessary. At the initialization of synchronization, each data record is checked for modification, addition or deletion which is indicated by a flag associated with each record in the database. Flags are set only if no synchronization has taken place since the action to the record. Each data record is compared with modified records in the database version in either device being written to the other device. An added data record is also written -to the other device. A record deleted from one device is deleted from the other on verification.

Each record in each device is checked for a change since last synchronization. The device initiating the synchronization is the resident device of the initial "focus" version of the database. This two-way synchronization is illustrated by block diagram of FIG. 7.

Figure 7:
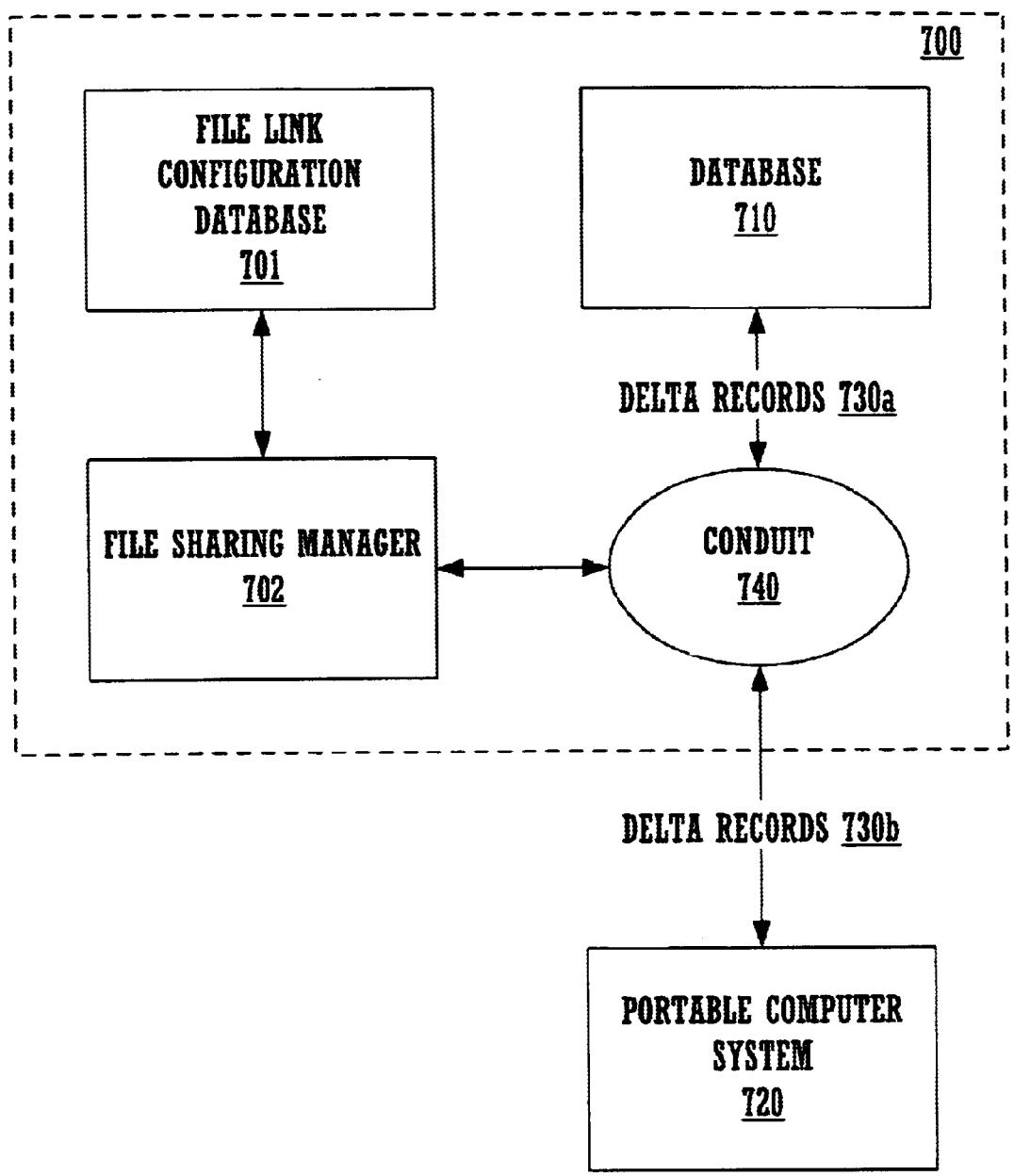
FIG. 7 illustrates, in block diagram, a basic synchronization process in accordance with one embodiment of the present invention.

FIG. 7 illustrates a synchronization system (also referred to as an "installer") in accordance with one embodiment of the present invention for allowing a portable computer system 720 (e.g., a palmtop or any portable computer system) to share information with a host computer system 700. Computer system 720 contains database 710, a software file sharing manager 702 (e.g., a hot-sync software manager), a file link configuration database 701, and a software conduit 740. The file link configuration database 701 is linked to the file sharing manager 702 and specifies, for a particular database, its source file, category information, and the frequency of update for the database. Conduit 740 outlines the manner in which records are to be synchronized between databases under control of file sharing manager 702. This process, including the file sharing manager and the conduit, is described in U.S. Pat. No. 5,884,323 by Hawkins et al., issued Mar. 16, 1999, assigned to the assignee of the present invention and incorporated herein by reference.

Portable computer system 720 is the PDA and computer system 700 is the host device. The enabling of file sharing between the two devices is accomplished in file sharing manager 702 and conduit 740. During synchronization between portable computer system 720 and database 710, delta records 730a and 730b are passed through conduit 740 between database 326 and a database resident on portable computer system 720 under control of the file sharing manager 702. Delta records 730a and 730b represent changes (including additions) that occurred on either portable computer system 720 or on computer system 700. After synchronization, these two databases will contain the same information. Namely, records updated on portable computer system 720 are reflected in database 710 and vice versa. The synchronization process (including the file sharing manager) is described in U.S. Pat. No. 6,006,274 by Hawkins et al., issued Dec. 21, 1999, assigned to the assignee of the present invention and incorporated herein by reference. Synchronization is also described in U.S. Pat. No. 5,727,202 by Kucala, issued Mar. 10, 1998, assigned to the assignee of the present invention and incorporated herein by reference, and also in U.S. Pat. No. 5,832,489 by Kucala, issued Nov. 3, 1998, assigned to the assignee of the present invention and incorporated herein by reference.

In the embodiment of the present invention discussed here uses parts of the synchronization system above. As the number of databases increases the number of operations involved in a synchronization increases exponentially. Approximately $2^n$ synchronization operations, as described in the paragraph previous, are required for "n" database versions. A synchronization in a network such as that shown in FIG. 1, where there are a large number of database devices and, a large number of database versions, would entail enormous growth. In addition to the host desktop 107, laptop 101 and server:104 on network 100, there are also other databases 12-1 through 12-*n*. In order to escape the enormous growth that would accompany a synchronization on a large, workplace network, this embodiment of the present invention implements a solution to Rule-Based N-Way Synchronization.

Rule-Based n-Way Synchronization reduces the number of iterative operations required with an n-way synchronization. It does so by invoking a set of hierarchical rules (See Table of Rules, FIG. 8). The rules control the operation of the file sharing managers so that only data records in each database requiring alteration are addressed. The hierarchy of the rules causes behavior much as in a 2-way synchronization in that, in a conflict between to actions, one will take precedence over the other. Importantly, as the focus of the synchronization changes from database copy to database copy, data records already processed are ignored. For example, a new modification of a record in one database version will supercede a deletion of the same record in another database.

The remainder of this discussion focuses on the operation of a rule-based n-way synchronization as it is implemented in one embodiment of the present invention. The discussion herein is not meant to exclude any other of the many different combinations of processes that could still be included within the framework of the present invention, but the detailed discussion of this specific embodiment will serve to illuminate the concepts under which the present invention operates.

To outline the rule set and the operations associated with each, FIG. 8, the rules table is included here. FIG. 8 summarizes the operations performed by the present invention during the record by record processing of the n-way synchronization process described in the flow diagram of FIG. 10. Each situation is illustrated in FIG. 8 by a separate table entry and the actions to be taken are shown on the right for each. Each record process of FIG. 8 is a data record of the focus database versus all other records of the same identification tag in all other database copies. The focus database copy in the example of FIG. 8 is the "DB1" column. At situation 810a, a record of the focus database copy is deleted, but no other record corresponding to the identification of this record is either modified or deleted in any other database copy. Therefore, the action to be taken is that the record is deleted from all database copies. At situation 810b, a record of the focus database copy is deleted from another database copy, but not from the focus database. The action to be taken is the same as for situation 810a.

Situation 810c is the same as situation 810a, except that same record identification that was deleted is also modified in another database copy. In this case, the action taken is that the modified record is added to all database copies that do not already contain the modification and the deletion is ignored. Situation 810d is an identical deletion of the same record from two or more database copies. The action to be taken is the same as for situation 810a. In situation 810e, a record of the focus database copy is modified. The action to be taken is that this modified record is added in each other copy not already having the modification. The situation 810f is that a record of the focus database copy is modified by two copies. In this case, each modified record is added to each database copy (using the record's same identification tag) that does not already have the modification. In situation 810g, a record was added to the focus database copy. This situation is treated just as a modification, e.g., the action of situation 810e is performed.

At situation 810*h*, a record of the focus database is modified, but this same record is modified in two other database copies. The action taken is the same as for situation 810*f*. In situation 810*i*, a record of the focus database copy is modified and this same record is also modified twice again in other database copies. The action to be taken is that each modified record is added in each other copy not already having the modification. Lastly, in situation 810*j*, a record of the focus database is modified and an identical modification is made in another copy. The action taken is that a single modification is added to each other database copy that does not contain the record.

After database copy "DB1" is the focus, next database copy "DB2" is made the focus, and these rules of FIG. 8 are repeated for each record of DB2. However, any record of DB2 is ignored that was processed when DB1 was the focus. This increases the processing speed of the synchronization. After database copy "DB2" is the focus, next database copy "DB3" is made the focus, and these rules of FIG. 8 are repeated for each record of DB3. However, any record of DB3 is ignored that was processed when DB1–DB2 were the focus. After database "DB3" is the focus, next database copy "DB4" is made the focus, and these rules of FIG. 8 are repeated for each record of DB4. However, any record of DB4 is ignored that was processed when DB1–DB3 were the focus. This process ends when DBL-n is finally processed as the focus. The synchronization result is the same no matter which database copy is selected as the first focus.

Figure 9:
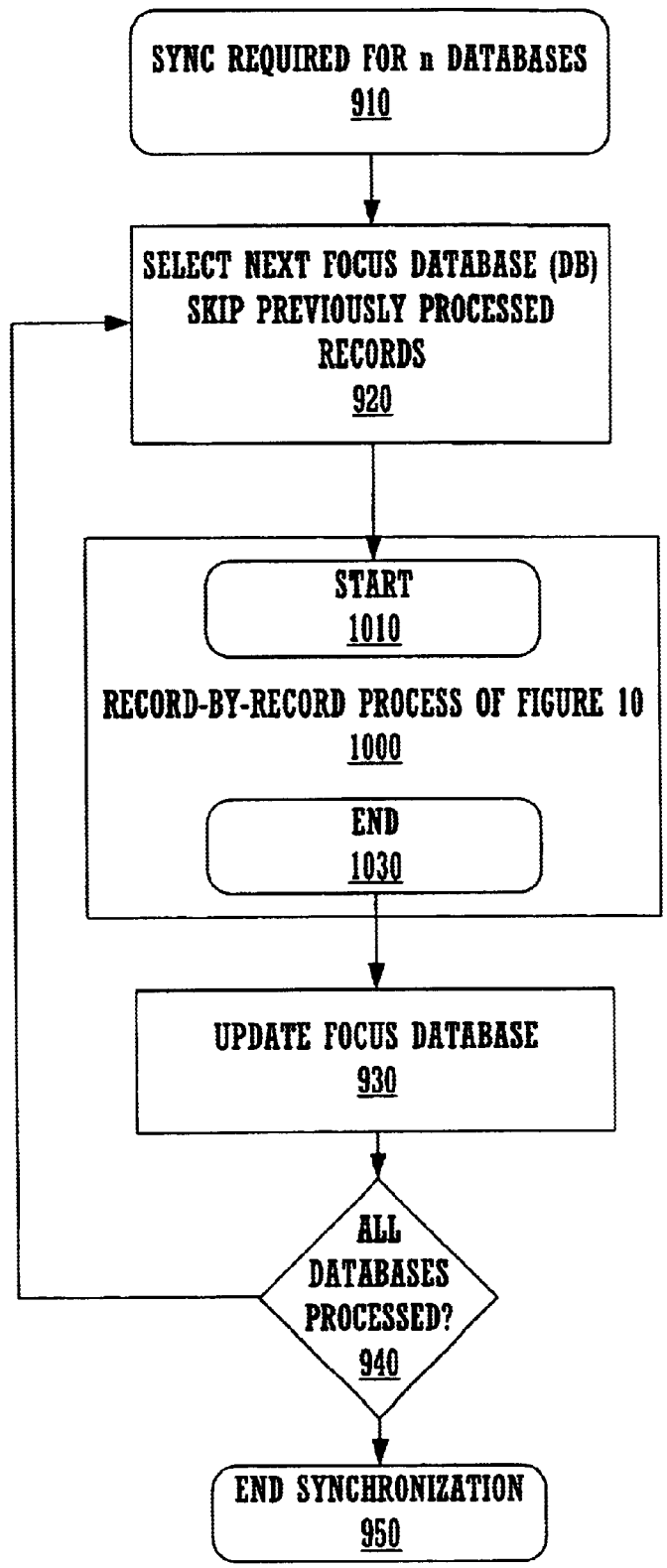
FIG. 9 is a flow chart illustrating one mode of operation in accordance with one embodiment of the present invention.
Figure 10:
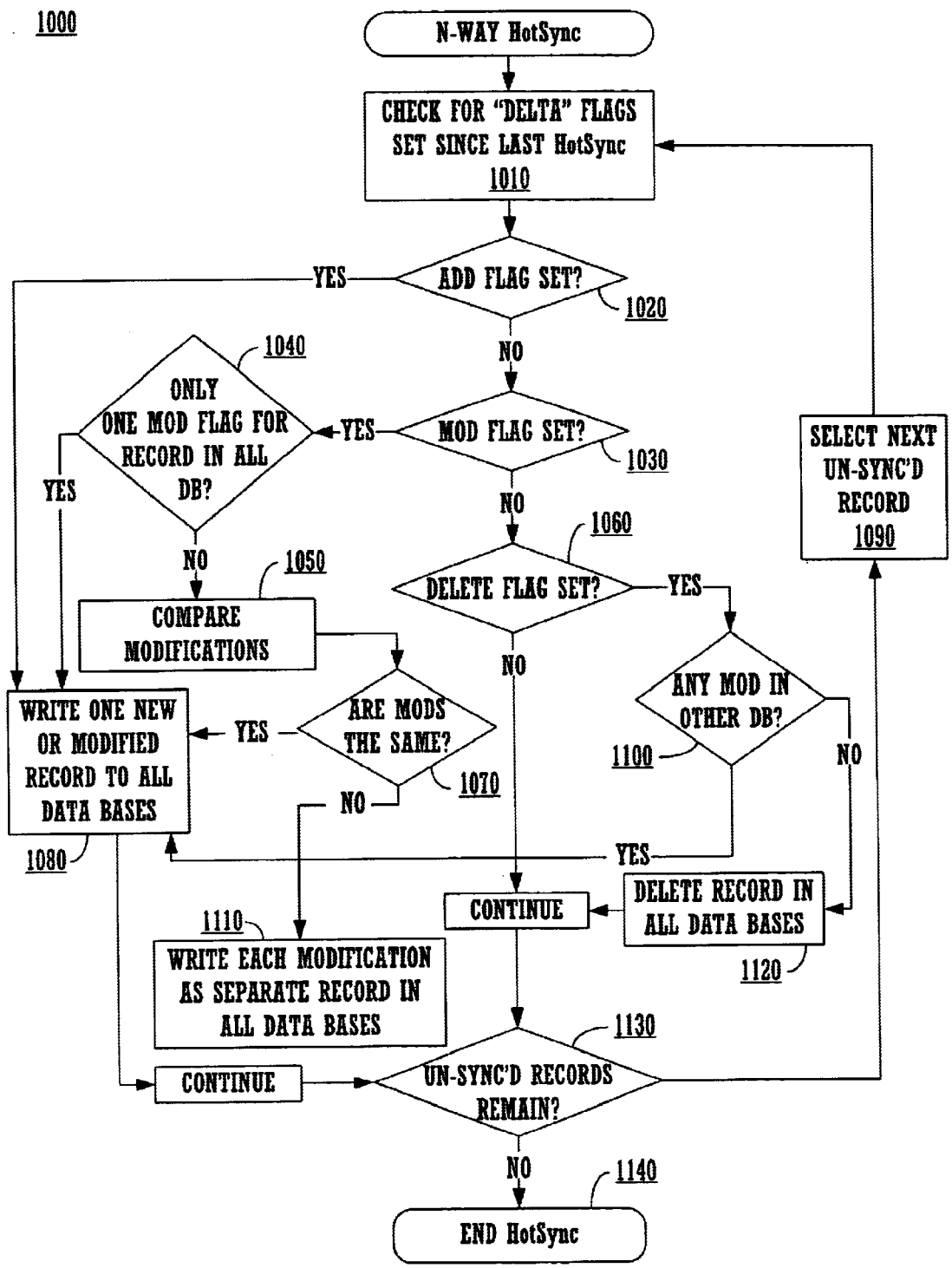
FIG. 10 is a detailed flow chart illustrating one mode of operation in accordance with one embodiment of the present invention.

The operation of an n-way synchronization under the rule structure can be visualized by reference to the flowcharts in FIGS. 9 and 10. In process 900 in FIG. 9, the process of synchronization is initiated, 910, by one of the devices in the net. The typical scenario sees the process initiated by either the palmtop device or its associated host device. A first "focus" database is then selected, 920. This is driven normally by either user desire or software-assigned priority.

After a focus database is selected, process 1000 on FIG. 10 commences at 1010. The data records of the focus database are scanned for "delta", or change, flags, 1020. The rules of FIG. 8 are then followed. If the delta is an addition of a new record, 1020, the new record is written to all other database copies, 1080. If a modification to an existing record in the focus database has occurred, the same record is checked in all other databases for modification, 1040. If none has been modified, the modification is written to all other copies using that record ID.

If other modifications have occurred to the same record ID in another database, then all the modifications are compared, 1050. If the modifications are identical, then the focus database record is written to all databases, 1080. If the modifications are not identical, then each modification is written to each copy. The focus database record modification is written to the existing record in the other databases and a new record ID is established that reflects each new modification to the same record found in the other databases, 1110. The process then looks to the next record in the list of changes in the focus database, 1120.

If the record modification flag is a deletion, the record ID is checked in all other databases for modification, 1100. If it has been modified in another database, the modified record is written to all, 1080, and none are deleted. If the record has not been modified in another database, it is deleted in all copies, 1120. Once each modified record in the focus database is accounted for, 1130, the process moves on to the next database, 1140/930. Each database in the loop is taken through the same process until no unmodified records remain, 940, then the synchronization is ended, 950.

With the process outlined in this embodiment of the present invention, only changed data records are considered. This avoids redundancies of checking and rechecking the modification status of each data record with comparison with each database. Also, when a new database is processed as the focus database, any record that was previously processed by another focus database is skipped, thereby preventing a geometric growth in processing time.

The foregoing discussion of one embodiment of the present invention demonstrates a method for rapid and reliable synchronization of multiple copies, or versions, of one or more databases in a network environment. The method discussed, while not limiting of all possible embodiments of the invention, provides the synchronization of an upwardly increasable number of copies of multiple databases without an attendant exponential increase in the amount of time and resources required to accomplish the synchronization.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a system having multiple copies of a database, a method of synchronizing said multiple copies of said database comprising the steps of:
    a) identifying a focus copy of said multiple copies of said database;
    b) processing and comparing records of said focus copy against records having a same identification tag but contained in other copies of said database to identify deleted and modified records with respect to said focus copy, said step only processing previously unprocessed records of said focus copy;
    c) removing from all said copies of said database a record indicated by step b) as being deleted by any copy of said database, provided said record was not also modified by any other copy of said database;
    d) with respect to any modified record indicated by step b), writing said modified record to all said copies of said database that do not already contain said modified record; and
    e) selecting a new focus copy of said copies of said database and repeating steps b)–e) until all said copies of said database have been processed as a focus copy.

2. A method as described in claim 1 wherein said step b) also identifies new records of said focus copy and wherein further said step d) applies to said new records.

3. A method as described in claim 1 wherein step d) applies to a record that has been modified in one copy but deleted in another copy of said database.

4. A method as described in claim 1 wherein step d) applies to a record that has been modified in one copy but deleted in two other copies of said database.

5. A method as described in claim 1 wherein with respect to a record that has been modified in more than one copy, said step d) writes said modifications of said record to all copies of said database that do not already contain said modifications.

6. A method as described in claim 1 wherein one of said separate device is a portable computer system.

7. In a system having copies of a database, each copy for use with a separate device, a method of synchronizing said copies of said database comprising the steps of:
   a) processing and comparing records of a designated focus copy of said database against records having a same identification tag but contained in other copies of said database to identify deleted and modified records with respect to said focus copy, said step only processing previously unprocessed records of said focus copy;
   b) removing from all said copies of said database a record indicated by step a) as being deleted by any copy of said database, provided said record was not also modified by any other copy of said database;
   c) with respect to any modified record indicated by step a), writing said modified record to all said copies of said database that do not already contain said modified record; and
   d) selecting a new focus copy of said copies of said database and repeating steps a)–d) until all said copies of said database have been processed as a focus copy.

8. A method as described in claim 7 wherein said step a) also identifies new records of said focus copy and wherein further said step c) applies to said new records.

9. A method as described in claim 7 wherein step c) applies to a record that has been modified in one copy but deleted in another copy of said database.

10. A method as described in claim 7 wherein step c) applies to a record that has been modified in one copy but deleted in two other copies of said database.

11. A method as described in claim 7 wherein with respect to a record that has been modified in more than one copy, said step c) writes said modifications of said record to all copies of said database that do not already contain said modifications.

12. A method as described in claim 7 wherein one of said separate device is a portable computer system.

13. A computer system comprising: a processor coupled to a bus; and an accessible memory space storing copies of a database, each copy for use with a separate device and wherein said memory space also contains instructions for implementing a method of synchronizing said copies of said database, said method comprising the steps of:
   a) processing and comparing records of a designated focus copy of said database against records having a same identification tag but contained in other copies of said database to identify deleted and modified records with respect to said focus copy, said step only processing previously unprocessed records of said focus copy;
   b) removing from all said copies of said database a record indicated by step a) as being deleted by any copy of said database, provided said record was not also modified by any other copy of said database;
   c) with respect to any modified record indicated by step a), writing said modified record to all said copies of said database that do not already contain said modified record; and
   d) selecting a new focus copy of said copies of said database and repeating steps a)–d) until all said copies of said database have been processed as a focus copy.

14. A computer system as described in claim 13 wherein said step a) of said method also identifies new records of said focus copy and wherein further said step c) applies to said new records.

15. A computer system as described in claim 13 wherein step c) of said method applies to a record that has been modified in one copy but deleted in another copy of said database.

16. A computer system as described in claim 13 wherein step c) of said method applies to a record that has been modified in one copy but deleted in two other copies of said database.

17. A computer system as described in claim 13 wherein, with respect to a record that has been modified in more than one copy, said step c) of said method writes said modifications of said record to all copies of said database that do not already contain said modifications.

18. A computer system as described in claim 13 wherein one of said separate device is a portable computer system.

19. A computer system as described in claim 13 wherein said database is an address database.

* * * * *